United States Patent [19]

Heslop

[11] 4,438,878
[45] Mar. 27, 1984

[54] SKI RACK AND CARRIER

[76] Inventor: Terence M. Heslop, 331 Sussex La., Lake Forest, Ill. 60045

[21] Appl. No.: 441,157

[22] Filed: Nov. 12, 1982

[51] Int. Cl.$^3$ .............................................. B60R 9/04
[52] U.S. Cl. .................................. 224/319; 224/315; 224/317; 211/60 SK
[58] Field of Search ............... 224/319, 321, 324, 325, 224/326, 917, 309, 310, 314, 315, 316, 320, 322, 323, 327, 328; 460/104, 105; 211/60 SK

[56] References Cited

U.S. PATENT DOCUMENTS 4,312,467  1/1982  Kulwin ............................... 224/315

FOREIGN PATENT DOCUMENTS 2810912  9/1979  Fed. Rep. of Germany ...... 224/319

OTHER PUBLICATIONS

*Mechanix Illustrated,* "A Lockable Ski Rack for Your Car," Jan. 1973, pp. 88–89.

*Primary Examiner*—Steven M. Pollard
*Assistant Examiner*—David Voorhees
*Attorney, Agent, or Firm*—Alan B. Samlan

[57] ABSTRACT

An improved ski rack and carrier for transporting skis and ski poles. A vehicle roof rack is secured to the automobile and receives a removable carrier which supports and retains multiple sets of skis and ski poles. The ski carrier has two pairs of pivotal arms which pivot around a central frame member with the skis and ski poles retained between the pivotal members and the central frame member. There is a locking end member which secures the pivotal arms to each other and to the roof rack and is adaptable to lock the ski carrier separate and apart from the roof rack.

21 Claims, 9 Drawing Figures

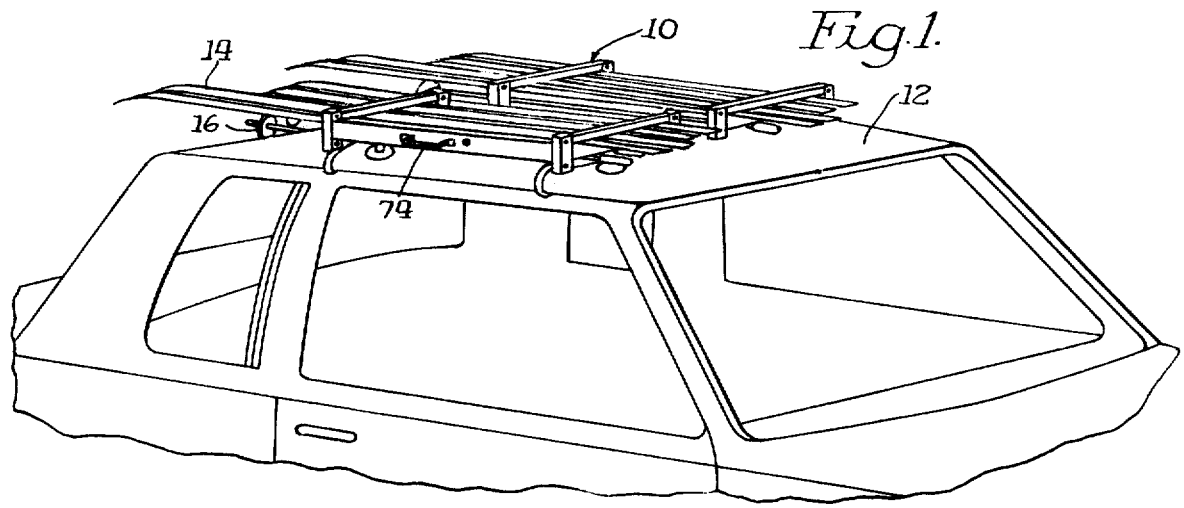
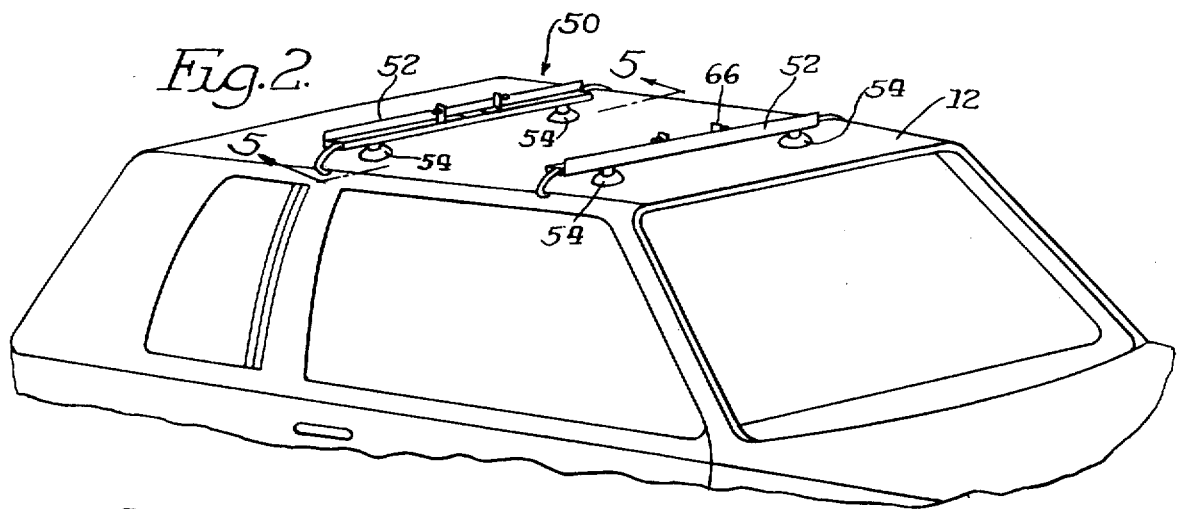
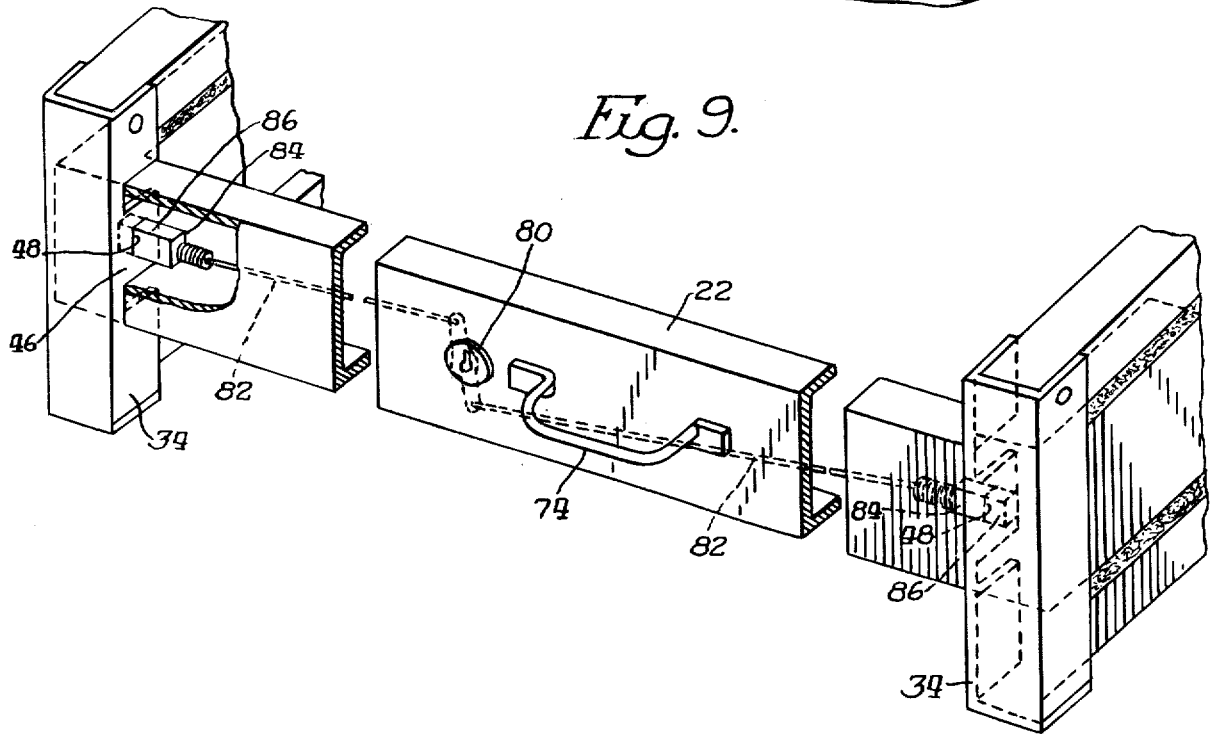

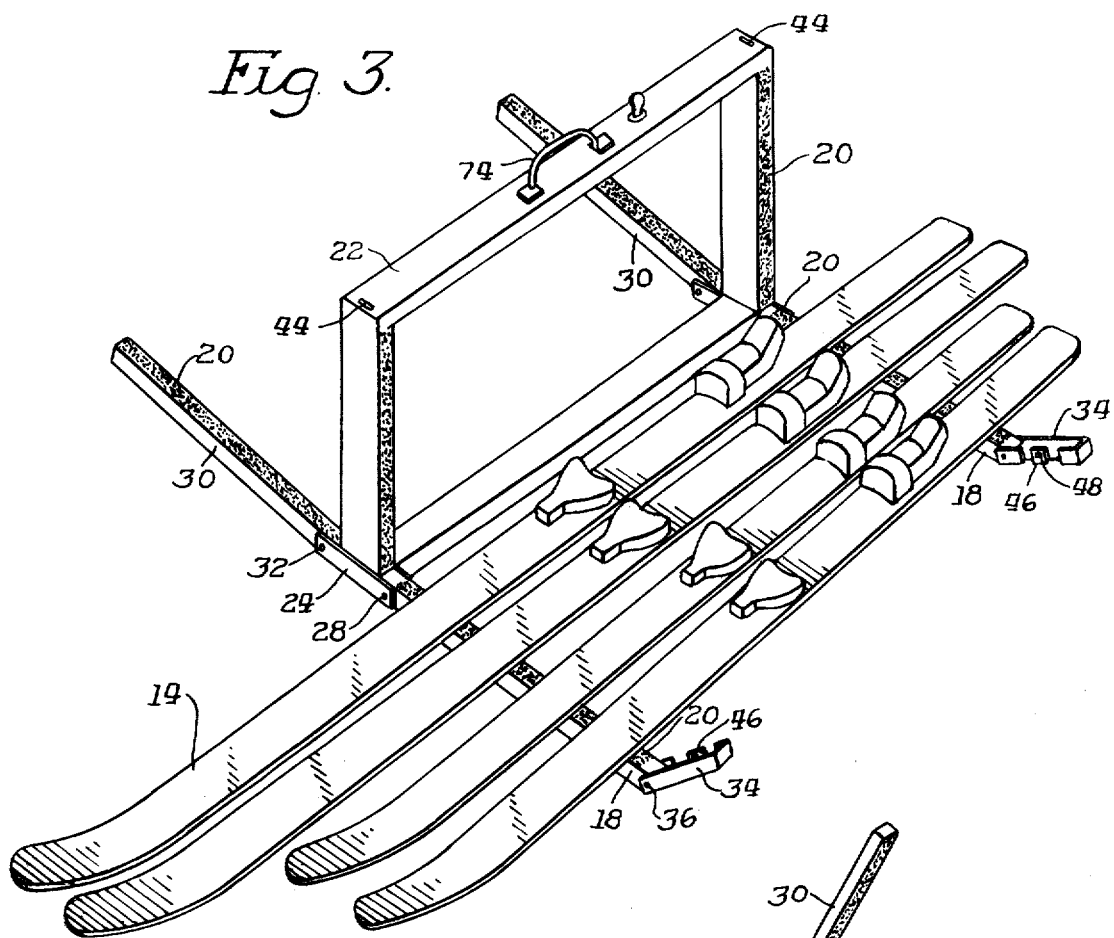
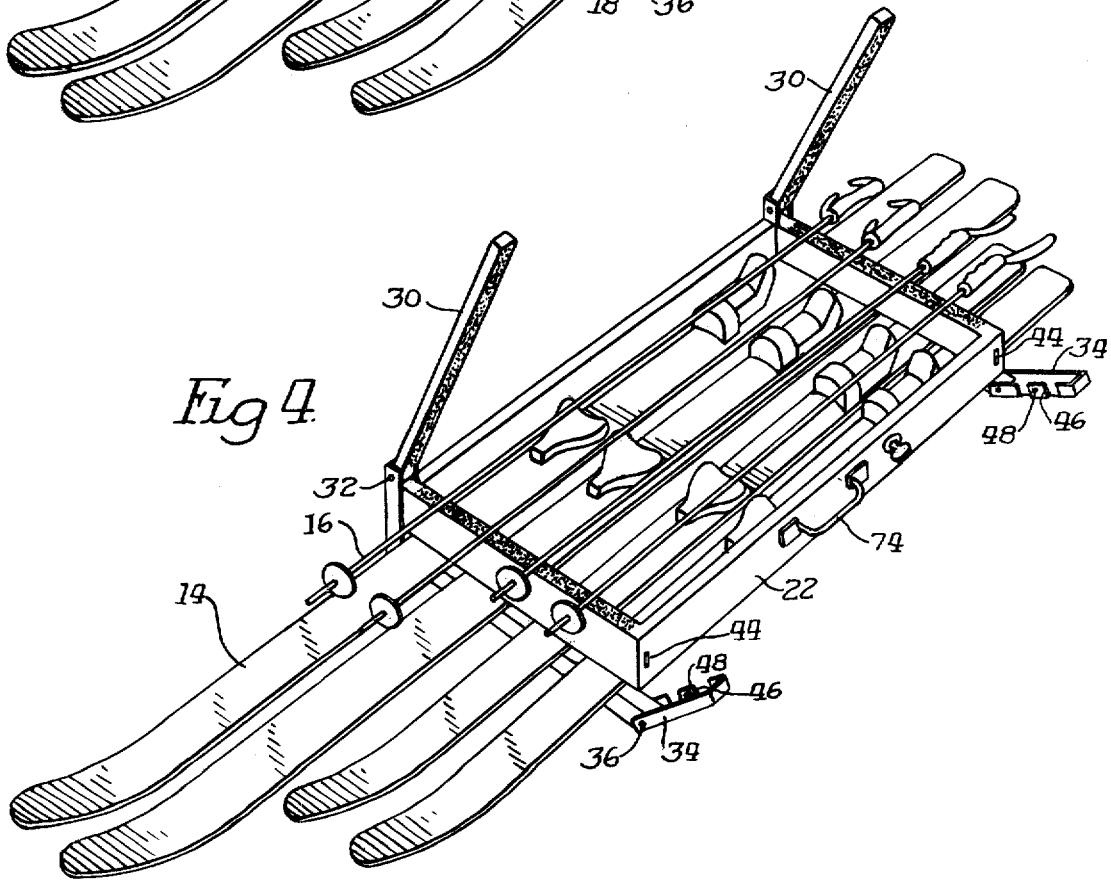

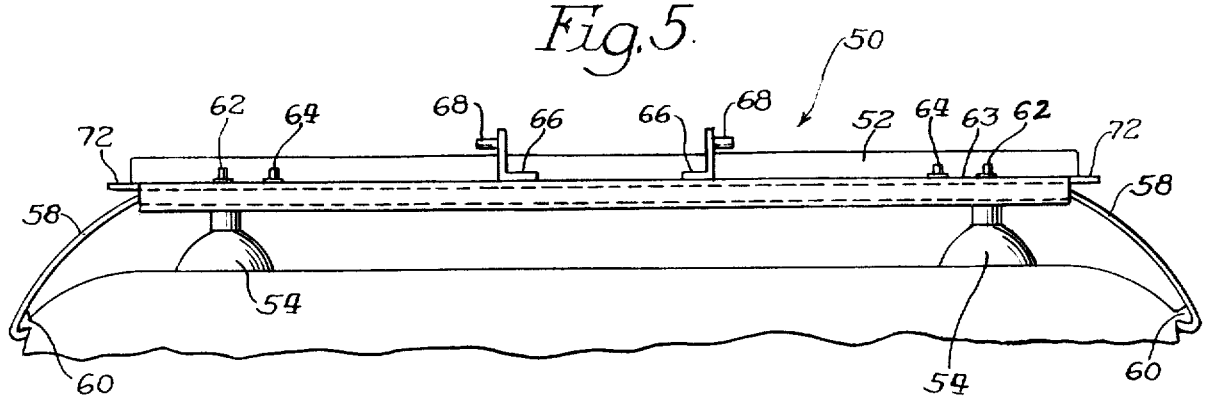
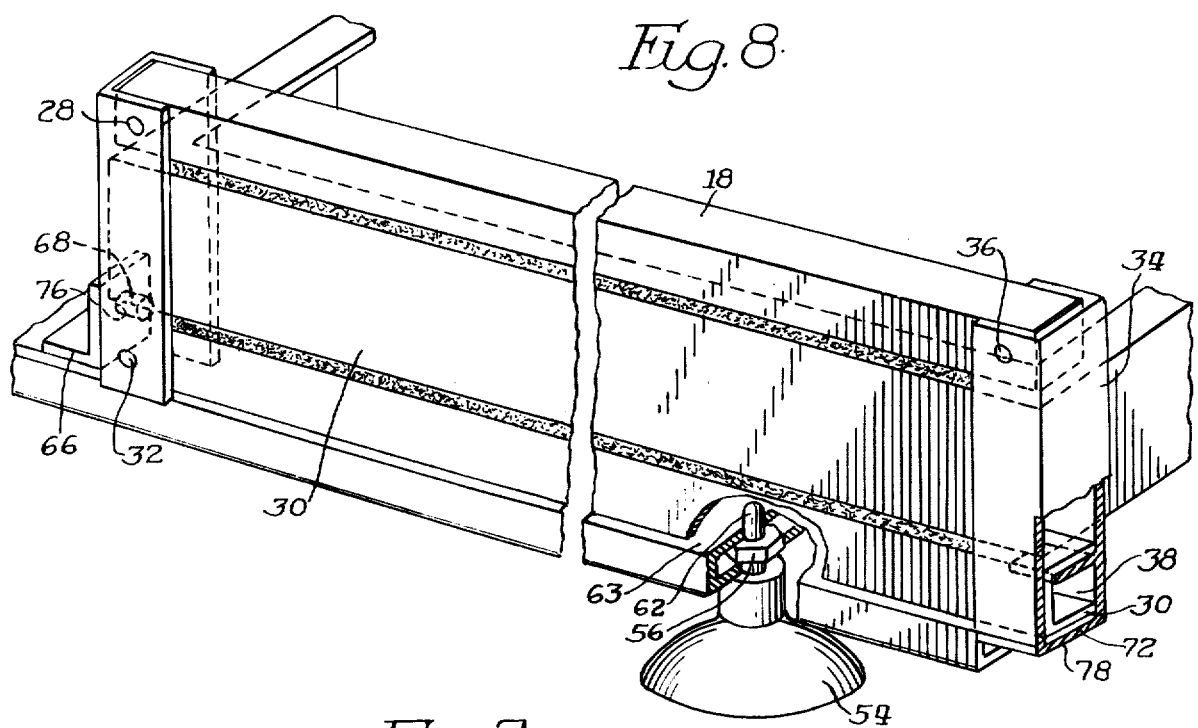
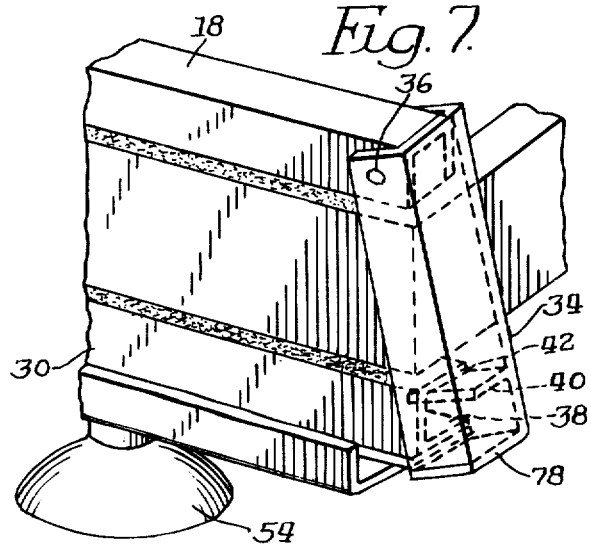
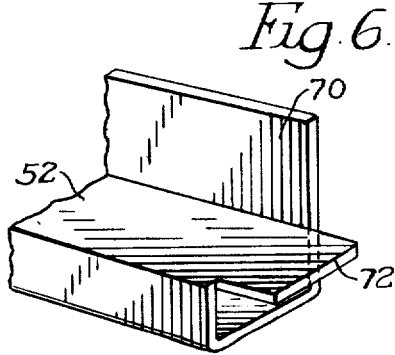

SKI RACK AND CARRIER

BACKGROUND OF THE INVENTION

This invention relates to a carrying device for multiple sets of skis and ski poles and more particularly to a carrier which is removable from a vehicle roof rack and transported separately. Such devices are found in Class 224, subclass 917 of the United States Patent and Trademark Office.

Due to the length of snow skis, they cannot be conveniently stored within the average automobile. As the number of areas of the country with ski slopes is relatively small, it is necessary for skiers to travel to the ski area generally by means of an automobile. In order to transport skis and ski poles, a variety of ski racks have been designed which attach and hold the items on to the exterior of an automobile. Most of these devices attach to the roof of the automobile.

Various factors enter into the desirable design characteristics of a ski rack and carrier. As the vehicle transports the skiers, skis and poles to normally a ski lodge, it then becomes necessary to move the skis from the vehicle to the slopes. As skiing has become a family sport, it has become common for one member of the family to carry multiple sets of skis and/or poles, especially in the case of the adult skiing with several small children. The size and awkwardness of carrying multiple sets of skis and poles, or even individual sets of skis and poles for a child, has necessitated the development of several types of ski carrying devices. A desirable carrier would be easily removed from the vehicle with a minimum amount of disassembly and then be transported to the ski slope independently of any means necessary to attach it to the vehicle. Furthermore, it is a desirable characteristic of the ski carrier to hold the skis and poles firmly and yet protect them from damage during transport as the skis and ski equipment are normally very expensive. Another consideration deals with theft of ski equipment and the desirability of the ski carrier to be locked either to the vehicle or independently to a secure object while retaining the skis in the locked mode.

Prior art devices have been designed which secure skis to a ski rack or bracket device which is mounted on the roof of a vehicle. Such ski racks generally have provisions for locking the skis to the rack. One such device is illustrated in U.S. Pat. No. 4,261,496 entitled "Ski Rack." This patent illustrates an adjustable and removable ski rack which is releasably attached to a bracket on a carrier track on the roof of a vehicle. The bracket can be moved along the carrier track. The ski rack does not act as a carrier for the skis which can be separately removed and held by the user for transporting the skis from the rack on the car to the ski area. Thus, the skis cannot be held within the ski carrier and the complete device, while retaining the skis, cannot be removed and carried separately.

In U.S. Pat. Nos. 4,171,759 and 4,294,387, there are illustrated similar type ski carrier devices which use brackets fastened to the vehicle. A separate carrier piece which holds the skis is slid on to the bracket. In both of these devices, the skis are held together bottom to bottom and then stored on an edge of the skis in the carrier. Both of these devices store and are designed for carrying a single set of skis and only the '387 device is adaptable for carrying a single set of skis and poles.

Another ski and pole carrying device is illustrated in U.S. Pat. No. 4,278,192. This device illustrates a ski carrier device which supports the skis and poles in bracket structures which are slid into slotted clamps which in turn are mounted on the roof of the vehicle. There is not any handle provisions on the ski carrier to easily carry the skis and poles. Furthermore, the ski brackets are not removed from the vehicle rack as a frame-type unit giving support to the skis and poles for ease of carrying. Also, only an individual set of skis and poles can be carried within each ski bracket leading to the use of multiple brackets for multiple sets of skis. The ski and poles must be slid into the brackets which do not have any provisions for opening them to allow easy placement of the skis and poles within the bracket. This device also stores the skis along an edge rather than along the bottom of the ski.

One prior art device which utilized a completely enclosed case on the roof of an automobile for storing and transporting skis is illustrated in U.S. Pat. No. 4,084,735. The case is removable from the top of the automobile and can be transported separately. This device is adaptable to carry multiple sets of skis, but is impractical because it is expensive to manufacture a complete enclosure, and it is difficult to transport the case because of the size and weight of the enclosure, skis and poles. Furthermore, such an enclosure is normally not necessary as skis and poles are built for outdoor use and do not normally have to be completely enclosed to protect them from the winter environment during driving to the ski slopes.

The major drawbacks of the devices of the prior art are that they do not provide for a carrier capable of holding multiple sets of skis and poles on the roof of a vehicle, and then allow the ski carrier to be easily removed from the vehicle and transported to the ski slope. Furthermore, the prior devices do not permit easy placement of the skis into the rack for storage or removal by allowing the skis to be stored in a flat position on their tops or bottoms with the ski poles stored either above or below the skis. Also, the prior devices do not allow for multiple ski carriers on a vehicle rack with each ski carrier capable of storing multiple sets of skis. This greatly limited the number of sets of skis and poles which could be transported on a vehicle.

Thus, there is a need for a ski carrier which is inexpensive to manufacture, is strong and light weight, can hold multiple sets of skis and poles, and is easily transportable from the vehicle to the ski area. Furthermore, it would be advantageous if the ski carrier could be easily removed from the vehicle roof rack without disassembly and then be used as a hand carrier for the skis. The carrier should also be adaptable to be locked either to the vehicle roof rack or to a convenient stationary item at the ski slope separately and apart from the roof rack or skis. Ideally, the ski carrier would be able to hold two complete sets of skis and poles and two ski carriers would be able to be mounted on the roof rack on the automobile. The ski carriers would be designed so that one person would be able to carry two complete sets of skis and poles in each hand or a total of four sets with ease.

SUMMARY OF THE INVENTION

The prior art problems described above are solved by the ski rack and carrier of the present invention in which a strong, light weight ski carrier is provided.

The inventive ski carrier is adapted for mounting on a rack which is securely mounted to the roof of a vehicle. A rectangular carrier frame has provisions for accepting multiple sets of skis such that they are stored horizontally and supported on the planar surface of their tops or bottoms. The carrier also provides for receiving multiple sets of ski poles which are stored above or below the skis. The storage of the skis and poles within the carrier frame is provided for by pivotal arms which pivot about a central frame member. The skis are stored on one side of the central frame member and the poles are stored on the other. The pivotal arms are on either side of the central frame member and hold down the skis and poles. An end locking piece locks the pivotal arms to each other and around the central frame member. This secures the skis and poles between the pivotal arms and the central frame member. The complete carrier device with the skis and poles is then mounted on the roof rack and the same end piece secures the carrier to the rack. The rack also has securing pins which are received by holes in the carrier to locate and secure the carrier frame to the roof rack. There is a lock which prevents the end members from being opened thus locking the skis in the carrier frame and the carrier frame to the roof rack. When the lock is opened, the carrier frame can be removed from the rack and easily transported by means of a handle which is grasped by the user. After removal of the skis and poles, the carrier frame can be locked to a stationary pole or similar structure by either a looped wire or by means of the pivotal arms.

OBJECTS AND ADVANTAGES

It is therefore, an object of this invention to provide a light weight yet strong hand held carrier for skis and ski poles. A related object is to provide a ski carrier which is inexpensive in its design and manufacture.

Yet another object is to provide a ski carrier which can store multiple sets of skis and poles therein and is designed such that multiple sets of ski carriers can be mounted on the roof of a vehicle. An advantage of this design is that it permits one person to carry at least four complete sets of skis and poles.

Still another object is to provide a ski carrier which will receive and store multiple sets of skis such that the skis are supported along their top or bottom planar surfaces and not along their edges.

It is still another object of this invention to provide a ski carrier which has handle means to easily place the ski carrier on the roof rack and to provide easy removal and carrying of the ski carrier separate and apart from the roof rack. A related object is to provide a ski carrier which has provisions for attaching a shoulder strap for easy carrying.

It is a further object to provide a ski carrier which has means to retain and support the skis at several points along the length of the skis and not only at one single point. This is advantageous in that it provides a carrier that safely and securely holds the equipment.

Another object is to provide a ski carrier which has latching means to lock the skis and poles into the ski carrier, and uses the same latching means to lock the carrier on to the roof rack.

It is another object to provide a ski carrier which can be transported to the ski slope and after removal of the skis and poles can be easily locked to a stationary object either by itself or with separate locking means.

These and other objects will be more readily apparent to one skilled in the art by reference to the accompanying drawings and detailed description of the preferred embodiment.

BRIEF DESCRIPTION OF THE DRAWINGS

FIG. 1 is a perspective view of the inventive carrier mounted on the roof of an automobile carrying several sets of skis and ski poles.

FIG. 2 is a perspective view of the automobile roof rack with the ski carrier removed.

FIG. 3 is a perspective view of the ski carrier in an opened position with two sets of skis ready to be secured in the carrier.

FIG. 4 is a perspective view of the ski carrier with the skis and ski poles ready to be secured by the ski carrier.

FIG. 5 is a front view of one of the roof rack channel members and taken along line 5—5 of FIG. 2.

FIG. 6 is a perspective view with portions removed of the end of the channel member of the roof rack.

FIG. 7 is a perspective view with portions removed illustrating the locking end member of the ski carrier as it is mounted on the roof rack.

FIG. 8 is a perspective view with portions removed of the ski carrier as it mounted on the roof rack.

FIG. 9 is a perspective view with portions removed of the key locking mechanism of the ski carrier.

DETAILED DESCRIPTION OF THE PREFERRED EMBODIMENT

Referring now to FIG. 1 there is illustrated an inventive ski carrier 10 mounted on a roof 12 of a vehicle. In the instant application, an automobile is illustrated, however, other types of vehicles having a flat roof would also be able to use the invention. The carrier is substantially rectangular with a front, rear and sides. There are two carriers 10 mounted on the roof 12, each carrier capable of handling several sets of skis 14 and poles 16.

The ski carrier 10 will now be more fully described by reference to FIGS. 3 and 4. To place the skis 14 into the ski carrier 10, the ski carrier 10 is first turned over in an inverted, upside down position. Two top pivotal arms 18 are lowered against a flat surface. Inside the top arm 18 is a raised layer of foam or other rubber-type material 20 to protect the skis. A central frame member 22 has brackets 24 at each end. The top pivotal arm 18 is pin connected to the bracket 24 at pin 28 which forms a pivotal or hinged connection. Thus, the central frame member 22 can be dropped down over the planar surface of the skis as illustrated in FIG. 4. The central frame member 22 also has a foam or rubber material 20 on the surface which contacts the skis.

With the central frame member 22 over the skis 14, the poles 16 are then placed on the top surface of the central frame member 22. Two bottom pivotal arms 30 are connected at one of their ends to the other end of the bracket 24 by means of a pin 32 forming a pivot or hinge connection. This enables the bottom pivotal arm to swing down over the poles 16. Again the inner surface of the bottom pivotal arm 30 is covered with a foam material 20. The foam material serves two purposes. The first is to protect the skis and poles and the second is to securely hold the skis and poles between the pivotal arms and the central frame member.

The top pivotal arm 18 and the bottom pivotal arm 30 form a pair which is secured together by means of a locking end member 34. This is more clearly illustrated in FIGS. 7 and 8 wherein the carrier 10 has been turned over and now is in its upright mounting position. The locking end member 34 is connected to the top pivotal arm 18 at the end opposite the end of the top pivotal arm which is fastened to the pin 28. The connection is similar to the pin connections previously described and a pin 36 provides the pivoting or hinge joint between the arm 18 and the locking end member 34. As the pivotal arms are manufactured from tubular metal, preferably aluminum, there is an internal hollow area 38 within the channel structure of the pivotal arm 30. The locking end member 34 has latching means which comprise a retaining lip 40 which is a shelf-like structure within the locking end member 34. This retaining lip 40 engages the underside of a top wall 42 of the bottom pivotal arm 30. By applying a slight compressive force to the pivotal arms 18, 30, the foam material 20 compresses down against the skis 14 and poles 16. In the closed configuration similar to FIG. 4, the locking end member 34 is then pushed upward such that the retaining lip 40 engages the surface of the top wall 42 of the bottom pivotal arm 30. This procedure is followed for both pairs of pivotal arms such that the skis and poles are secured at two points along their length. The entire ski carrier 10 can then be turned over and oriented such as shown in FIGS. 7 and 8.

It can also be seen in FIGS. 3 and 4 that in the front of the central frame member 22 there is a vertical slot 44 at either side. As the locking end member 34 is pushed in towards its locked position, a locking tongue 46 having an aperture 48 centrally disposed is received by the slot 44. The purpose of this locking tongue will be more fully described below.

Turning to FIGS. 2 and 5, the mounting of the ski carrier to the roof 12 can be more clearly seen. A roof rack 50 is comprised of two channel members 52 each mounted to the roof 12. The channel members 52 are identical and face each other when mounted to the roof 12. The channel members 52 are fastened to the roof by means of suction cups 54 and tension gutter clips and straps 58. The suction cups 54 are fastened to the channel 52 by means of threaded fasteners 56. (FIG. 8) The tension gutter clips and straps 58 have one end secured to the channel member 52 and the other end bent back down under itself to form a clip which is secured under a gutter of the car 60. Thus, the channel members 52 are secured to the roof of the car but can be removed when no longer needed.

It can be seen in FIG. 8 that one end of the threaded fastener 56 has a protrusion or locating pin 62 extending up above a horizontal surface 63 of the channel member 52. A second locating pin 64 is mounted to the channel member 52 such that it also extends up above the horizontal surface of the channel member 52. Mounted to the channel member 52 are L-brackets 66 having retaining and locating pins 68 pointing away from the center line of the car and towards the gutters 60. The L-brackets are fastened by means of bolts or welding to the horizontal surface of the channel member 52.

The configuration of the channel member 52 is shown in the end view of FIG. 6. The channel member 52 has an upstanding vertical wall 70 to help secure the ski carrier 10 on to the rack 50. Furthermore, at each end of the channel member 52 is a tongue 72 which extends out past the end of the channel member 52 and upstanding wall 70.

The ski carrier 10 is grasped by a handle 74 which is firmly affixed to the front of the central frame member 22. The overall length of the ski carrier 10 is slightly less than the dimension between the upstanding vertical walls 70 of the two channel members 52. The ski carrier 10 is placed between the two channel members 52. There is a hole 76 at the back of each of the brackets 24. The position of the hole 76 is such that it will be aligned with and receive the pin 68 as the ski carrier 10 is slid along the channel members 52. When the bracket 24 comes to rest against the L-bracket 66, the locating pins 62, 64 should be in alignment with complementary receiving holes (not shown) in the underside of the bottom pivotal arm 30. Thus, the carrier 10 is now secured at several points by means of the locating pins 62, 64 and 68. Additionally, the upstanding vertical walls 70 prevent movement in the forward or backward directions as the car starts and stops.

In order to latch the ski carrier 10 to the roof rack 50, the locking end member 34 is moved to a second locking position. In the first locking position, as illustrated in FIG. 7, the top pivotal arm 18 and bottom pivotal arm 30 were locked together. The same locking end member 34 is used to lock the entire ski carrier 10 to the roof rack 50. This is accomplished by pushing the locking end member 34 further down and around the tongue 72. Thus, an end wall 78 of the locking end member 34 will come around and underneath the tongue 72 firmly locking the end member 34 about the bottom pivotal arm 30 and tongue 72. It can be seen that in order to release the ski carrier 10 from the roof rack 50, the locking end member 34 can be rotated up as illustrated in FIG. 7 to the first position wherein the end wall 78 clears the tongue 72. The retaining lip 40 is still engaged with the top wall 42 of the bottom pivotal arm 30 so that the skis and poles are still secured by means of the pivotal arms being locked to each other and around the central frame member 22. The carrier 10 is free to be removed from the rack 50 in this position.

For security reasons it is desirable that the entire device be lockable by means of a key-type locking device. This is accomplished by the mechanism shown in FIG. 9. Adjacent the handle 74 is a barrel or cylinder-type key lock 80. Movement of the cylinder causes links 82 to be pushed or pulled responsive thereto. Each link 82 is connected to a spring bolt lock 84 with a bolt 86 operated in response to turning of the lock 80. The bolt 86 is dimensioned to be received by the aperture 48 in the locking tongue 46 of the locking end member 34. Thus, with the locking member 34 in its closed position, and the bolt 86 passing through the aperture 48, the locking end member 34 cannot be pivoted around the pin 36. Thus, the ski carrier 10 is locked on to the roof rack 50.

With the ski carrier 10 removed from the roof rack 50, it can still be locked such that the skis and poles cannot be removed from the carrier 10. Thus, the locking mechanism works independently of whether the carrier 10 is mounted on the roof rack 50 or separate therefrom. With the skis and poles removed from the carrier 10, the carrier can be locked to a pole or similar secure structure. This is accomplished by placing a wire cable or chain through the location normally occupied by the skis, and then locking the ski carrier as previously described and locking the chain separately. Alternatively, the ski carrier can be locked to any secure cable or thin pole by placing the secure object between a pivotal arm and the central frame member. The ski carrier is then locked about the secure object. Other methods of locking the ski carrier could also be improvised.

The central frame member 22 is also provided with a clip on either end to secure a shoulder strap to it. Thus, the user could either hold the ski carrier by means of the handle 74 or throw the shoulder strap around his shoulder and use it as an aid in transporting the ski carrier 10. With this configuration, a person can carry one ski carrier in each hand with each ski carrier capable of holding several sets of skis. With the configuration illustrated, one person can carry four complete sets of skis and poles. The skis and poles are securely retained within the ski carrier during automobile transport or when removed from the roof rack and subsequently transported to the ski slopes.

Thus, it is apparent that there has been provided, in accordance with the invention, a ski carrier and rack that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A carrier for skis and ski poles for mounting on a roof of an automobile or similar structure comprising:
   rack means,
   mounting means on the rack means to securely mount the rack means to the roof,
   a pair of substantially identical carrier frames adapted for removable mounting adjacent to each other to the rack means,
   each carrier frame having a rectangular central frame member and top and bottom pairs of pivotal arms, each pivotal arm connected at one end to the central frame member, the pivotal arms spaced apart from each other with the top pair and bottom pair of arms flanking the central frame member, each pair of pivotal arms adapted to receive and secure multiple sets of skis or ski poles at two points between the arms and the central frame member,
   a locking end member for securing the top pivotal arms to the bottom pivotal arms in a locked relationship with each other and the central frame member thereby securing the skis and ski poles between the pivotal arms and the central frame member, and
   locking means to secure the carrier frame to the rack means,
   whereby the carrier frame can be removed from the rack means and be easily transported while securely retaining the skis and ski poles.

2. The carrier of claim 1 and further comprising handle means attached to the carrier frame to permit a user of the carrier to easily grasp and hold the carrier frame.

3. The carrier of claim 2 wherein the rack means comprises at least two channel members to be mounted to the roof, the channel members having locating means thereon to position and retain the carrier frame on the channel members.

4. The carrier of claim 3 wherein the locating means comprises a locating pin mounted on the channel member and a complementary pin receiving hole in the carrier frame which receives the pin when the carrier frame is mounted on the rack means.

5. The carrier of claim 4 and further comprising a second locating pin mounted on an L-bracket which in turn is mounted on the channel member, and a second complementary pin receiving hole in the carrier frame which receives the second pin when the carrier frame is mounted on the rack means.

6. The carrier of claim 5 wherein the locking end member is fastened to the other end of the pivotal arm opposite the first end, and has latching means to cause the locking end member and pivotal arm fastened thereto to be secured about the central frame member.

7. The carrier of claim 6 wherein the locking means comprises second latching means on the locking end member which are received by one of the channel members causing the locking end member and carrier frame to be secured to the rack means.

8. The carrier of claim 7 wherein the locking end member is movable between multiple positions, one of the positions securing the pivotal arm about the central member while locking the carrier frame to the rack means and a second position unlocking the carrier frame from the rack means while still securing the pivotal arm about the central member, thereby permitting removal and transport of the carrier frame separately from the rack means.

9. The carrier of claim 8 wherein the second latching means comprises a closed end portion on the locking end member and a tongue member extending from an end of the channel adjacent the locking end member whereby the closed end portion receives and retains the tongue member in a locking relationship.

10. The carrier of claim 1 and further comprising resilient material placed between the central frame member and the pivotal arms to secure and protect the skis.

11. A carrier for skis and ski poles adapted for mounting on the roof of an automobile or similar structure comprising:
   rack means to be securely mounted on the roof of the vehicle,
   a substantially rectangular carrier frame having a front, a back and two opposite sides comprising:
   two pairs of pivotal arms, one pair at each of the opposite sides of the carrier frame,
   each pair of pivotal arms comprising a top and bottom pivotal arm,
   a central frame member separating the top and bottom pivotal arms,
   each pivotal arm pivotally connected at one end and positioned on opposite sides of the central frame member,
   the pivotal arms and frame member adapted to receive multiple sets of skis or ski poles between the two top pivotal arms and the central frame member and the two bottom pivotal arms and the central frame member,
   a locking end member for each pair of pivotal arms to secure the top and bottom pivotal arms in a locked relationship with each other and the central frame member;
   locking means to secure the carrier frame to the rack means;
   whereby the carrier frame can be removed from the rack means and be easily transported while securely retaining the skis and ski poles.

12. The carrier of claim 11 wherein a portion of the planar surface of the skis are supported between two of the pivotal arms and the central frame member.

13. The carrier of claim 12 and further comprising handle means attached to the carrier frame to permit a user of the carrier to easily grasp and hold the carrier frame.

14. The carrier of claim 13 wherein the rack means comprises at least two channel members to be mounted to the roof, the channel members having locating means thereon to position and retain the carrier frame on the channel members.

15. The carrier of claim 14 wherein the locating means comprises a locating pin mounted on the channel member and a complementary pin receiving hole in the carrier frame which receives the pin when the carrier frame is mounted on the rack means.

16. The carrier of claim 15 and further comprising a second locating pin mounted on an L-bracket which in turn is mounted on the channel member, and a second complementary pin receiving hole in the carrier frame which receives the second pin when the carrier frame is mounted on the rack means.

17. The carrier of claim 14 wherein the locking end member is fastened to the other end of the top pivotal arm and has first latching means received by the other end of the bottom pivotal arm to cause the top and bottom pivotal arms to be fastened together by means of the locking end member and secured about the central frame member.

18. The carrier of claim 17 wherein the locking means comprises second latching means on the locking end member which are received by one of the channel members causing the locking end member and carrier frame to be secured to the rack means.

19. The carrier of claim 18 wherein the locking end member is movable between multiple positions, one of the positions securing the top pivotal arm to the bottom pivotal arm about the central frame member while locking the carrier frame to the rack means, and a second position unlocking the carrier frame from the rack means while still securing the pivotal arms to each other about the central member, thereby permitting removal and transport of the carrier frame apart from the rack means.

20. The carrier of claim 19 wherein the second latching means comprises a closed end portion on the locking end member and a tongue member extending from an end of the channel adjacent the locking end member whereby the closed end portion receives and retains the tongue member in a locking relationship.

21. The carrier of claim 11 and further comprising resilient material placed between the central frame member and each of the pivotal arms to secure and protect the skis and poles.

* * * * *